June 24, 1958
C. S. STEADMAN
2,840,775
GENERATOR CONTROL FOR VEHICLE TRANSMISSION SYSTEM
Filed Jan. 7, 1955
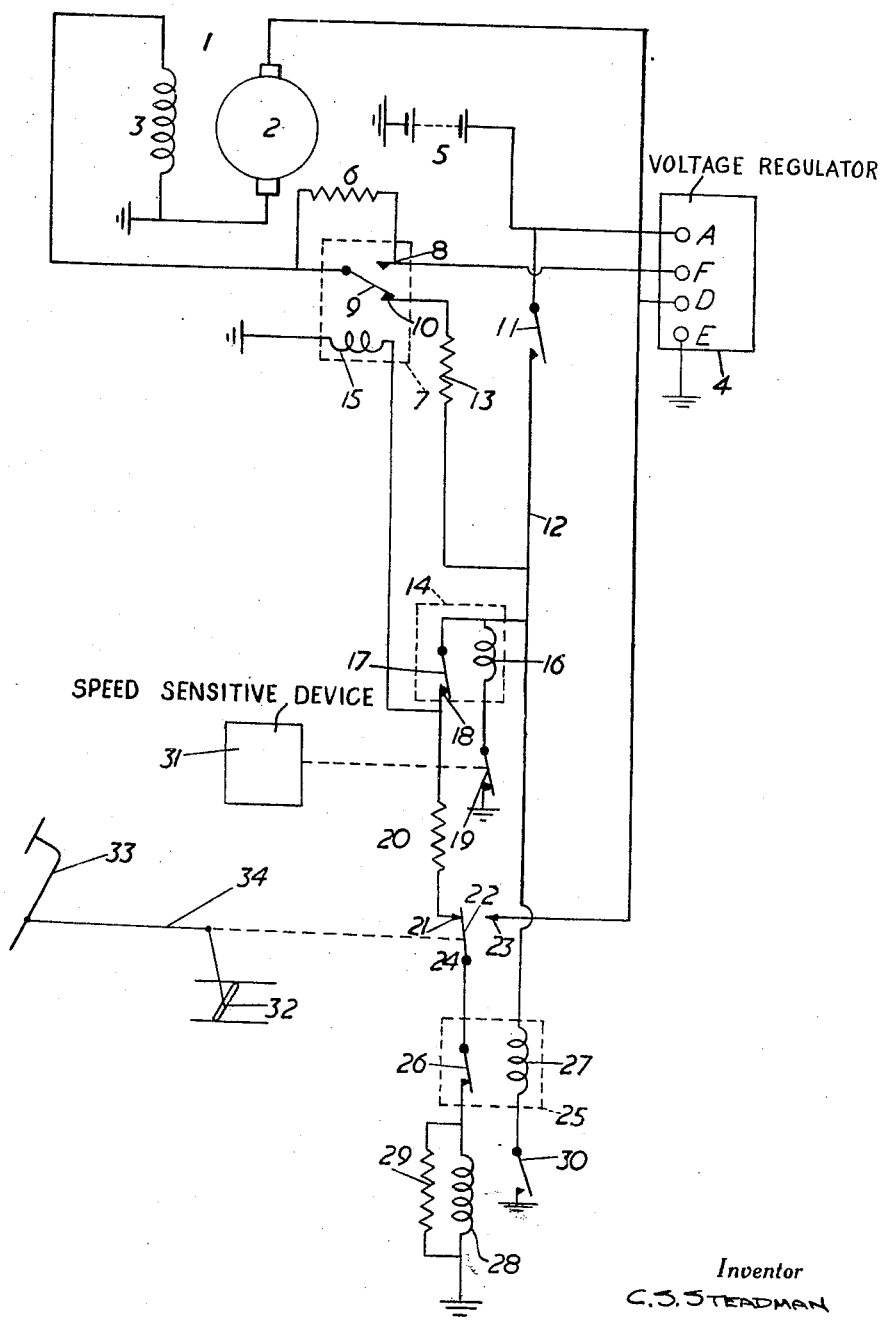
Inventor
C.S. STEADMAN
By Moore & Hall
Attorneys United States Patent Office 2,840,775
Patented June 24, 1958

2,840,775

GENERATOR CONTROL FOR VEHICLE TRANSMISSION SYSTEM

Clifford Stuart Steadman, Surbiton, England, assignor to Smiths America Corporation, Lakeland, Fla.

Application January 7, 1955, Serial No. 480,406

Claims priority, application Great Britain January 7, 1954

3 Claims. (Cl. 322—28)

The present invention relates to power transmission systems for motor vehicles of the kind which incorporate an electrically-energised clutch and an electric generator driven by the vehicle engine, which supplies electric current for energisation of the clutch and also supplies other electric power requirements of the vehicle. The electric generator upon a motor vehicle is usually associated with a voltage regulator which controls the generator field current in such a way that the generator output voltage reaches its normal value (usually some 6 or 12 volts) at engine speeds corresponding to relatively low vehicle speeds. If the clutch is energised by the output voltage from such a generator, starting of the vehicle from rest is not satisfactory (as the clutch is fully energised at too low an engine speed), but if the generator circuit is merely modified to give a variation of voltage with engine speed appropriate to starting from rest in a low gear ratio, the engine speed at which full voltage becomes available will be so high as to prejudice the supply of elecrtic power for other purposes in higher ratios.

In accordance with the present invention we provide a power transmission system for a motor vehicle comprising an electrically-energised clutch, a direct-current generator driven by the engine of the vehicle, said generator having an armature and a field winding, the armature voltage being dependent upon engine speed and current in the field winding, electrical connections from the armature to the clutch, a voltage regulator giving an output responsive to the armature voltage, variable-resistance means connecting the voltage regulator output and the field winding, and means responsive to the speed of the vehicle to control said variable resistance means.

Preferably the variable resistance means comprise a fixed resistor and a switch in parallel therewith, the speed-responsive means closing said switch when the vehicle speed exceeds a predetermined value.

Preferably also means are also provided to produce a substantially constant component of current in the field winding at speeds below the predetermined speed. Then, at speeds below the predetermined speed, the armature voltage will depend upon speed in accordance with the sum of two terms respectively proportional to the square of the speed and the speed.

An embodiment of the invention will now be described with respect to the accompanying drawing.

A conventional dynamo 1, driven from the engine of the vehicle, has an armature 2 and field winding 3, one terminal of each of these being earthed. The non-earthy terminal of armature 2 is connected to terminal D of a conventional voltage regulator and cut out, indicated at 4. One terminal A of 4 is connected to the non-earthy terminal of the usual accumulator 5. Current for the dynamo field is supplied from terminal F of regulator 4, the regulator normally operating in a known manner to maintain the field current at such a value as to maintain the voltage at terminal D substantially constant (for sufficiently high engine speeds). Terminal F is connected through a resistor 6 to the non-earthy terminal of winding 3. It is also connected to one fixed contact, 8, of a change-over relay 7. The moving contact, 9, of this relay is connected to the non-earthy terminal of winding 3. Flow of current from battery 5 is controlled by the usual ignition switch 11, current passing therethrough, when closed, to line 12. Line 12 is connected through a resistor 13 to the second fixed contact 10 of change-over relay 7. Line 12 is also connected to one terminal of the operating coil 16 of a relay 14, and to the moving contact 17 of that relay. The second terminal of coil 16 is connected through a normally closed switch contact 19 to earth. Contact 19 is controlled by a speed sensitive device indicated at 31 driven from the output shaft of the vehicle gear box, and is opened when the vehicle speed reaches a value above which full clutch energisation is required. The fixed contact, 18, of relay 14 is connected to the non-earthy terminal of operating coil 15 of relay 7. It is also connected through a resistor 20 to one fixed contact, 21, of a change-over switch 24. Switch 24 is actuated in accordance with movement of the usual engine throttle, indicated at 32, which is controlled by a pedal indicated at 33 through a linkage indicated at 34.

The second fixed contact, 23, is connected to the non-earthy dynamo armature terminal. The moveable contact 22 of the switch is connected, through the normally-closed contact 26 of a gear shift relay 25, to the non-earthy terminal of a clutch-energising winding 28. A resistor 29 is connected in parallel with winding 28 to dissipate electromagnetic energy stored in the winding when the circuit is broken. Operating coil 27 of relay 25 may be connected to earth through a normally-open gear shift switch 30, this switch being closed only when a gear change is being made. The clutch may be of any convenient form, but is preferably of the form in which torque is transmitted between driving and driven members through a mass of finely divided ferromagnetic particles subjected to a magnetic field controlled by the energising winding, such as is shown in British specification No. 649,553, i. e. a magnetic powder clutch.

It should be stated that all the contacts are shown in the positions they assume when the vehicle is at rest, the various operating coils are de-energised, and the throttle is closed.

The operation of the system will be most readily appreciated by considering the sequence of operations in starting from rest.

Switch 11 is closed, line 12 energised and coil 16 energised. Exciting current for field winding 3 thus flows through resistor 13. The clutch winding is not energised, since 22 is in the position shown and 17 is opened. Also, as the engine is stationary, the voltage between terminal D and earth is zero. The engine is then started, and first gear engaged (the clutch still remaining de-energised). When the throttle is opened contact 22 engages contact 23, so that clutch winding 28 is energised by the dynamo output voltage. Resistor 6 is such as to prevent sufficient field current being supplied from terminal F of regulator 4 to raise the voltage to its usual value until the engine speed reaches a value corresponding to a road speed of about 10 M. P. H. at which full clutch energisation is required, while the substantially constant component of exciting current provided via resistor 13 gives a component of generator voltage rising linearly with speed which, at that speed, is small compared with the component arising from the current from terminal F. This condition may readily be fulfilled by giving resistor 13 a value about four times that of resistor 6. The energisation of the clutch, and hence its capacity for transmitting torque, thus rises with engine speed, gradually at first and more rapidly as speed rises until full energisation is reached. The energisation of the clutch thus matches, at least approximately, the torque/speed characteristic of the engine. When the speed at which full energization is required is reached contact 19 is opened by device 31, coil 16 is de-energised, contact 17 is closed and coil 15 is energised. Resistors 6 and 13 are thus removed from the circuit and the dynamo circuit reverts to its conventional condition, the field current being supplied entirely by the regulator 4 and controlled in the usual manner. When a change of gear is made switch 30 is opened, de-energising coil 27, opening contact 26 and de-energising clutch winding 28. When the throttle is released with the vehicle in motion above the speed mentioned, moving contact 22 engages fixed contact 24 and the clutch winding is energised (though not to the maximum extent) via resistor 20 and contacts 17 and 18 from battery 5. The braking action of the engine may thus be utilised.

When the vehicle is slowing down contact 19 remains open (owing to hysteresis in the speed-sensitive device controlling it) until the vehicle speed drops below the earlier mentioned speed, e. g. to about 6 M. P. H., when the resistors 6 and 13 etc. are re-inserted in the dynamo field circuit.

It will be realised that the speeds at which the switch is to operate will have to be chosen, in any particular vehicle, in relation to the characteristics of the engine and the gear ratio, as will also the values of resistors 6 and 13. Resistor 20 will be given a value such that the clutch, when energised therethrough, will be capable of transmitting the maximum engine braking torque required.

I claim:

1. A power transmission system for a motor vehicle comprising an electrically energized clutch, a direct current generator driven directly by the engine of the vehicle, said generator having an armature and a field winding, the armature voltage being dependent upon engine speed and current in the field winding, electrical connections from the armature to the clutch, a voltage regulator giving an output rseponsive to the armature voltage, variable high resistance means connecting the voltage regulator output and the field winding, and means responsive to the speed of the vehicle to control said variable resistance means, said variable resistance means comprising a fixed resistor and a switch in parallel therewith, said speed-responsive means closing said switch when the vehicle speed exceeds a predetermined value, means to produce a substantially constant component of current in said field winding at speeds below said predetermined speed, said means to produce a substantially constant component of current comprising a battery and a further fixed resistor, said battery being connected to said field winding through a said further fixed resistor, the output of the voltage regulator is connected to the first fixed contact of a single-pole changeover relay having two fixed contacts and a moving contact, the fixed resistor is connected between the first fixed contact and the moving contact, the further fixed resistor is connected between the second fixed contact and the battery, and the speed-responsive means position the moving contact in contact with the second fixed contact below the predetermined speed and in contact with the first fixed contact above the predetermined speed.

2. A system as claimed in claim 1 comprising also throttle position responsive means to disconnect the clutch energising winding from the armature and to connect it to the battery for small throttle openings.

3. A system as claimed in claim 2 comprising also means to de-energise the clutch energising winding during a change of gear ratio.

References Cited in the file of this patent

UNITED STATES PATENTS

| 1,794,613 | Heany | Mar. 3, 1931 |
| 1,855,333 | Borevec et al. | Apr. 26, 1932 |
| 2,467,968 | Chritchfield et al. | Apr. 19, 1949 |

FOREIGN PATENTS

| 191,720 | Switzerland | Sept. 16, 1937 |
| 649,553 | Great Britain | Jan. 31, 1951 |